(12) United States Patent
Ryan et al.

(10) Patent No.: US 9,973,401 B2
(45) Date of Patent: May 15, 2018

(54) SERVICE FUNCTION PATH PERFORMANCE MONITORING

(71) Applicant: Intel Corporation, Santa Clara, CA (US)

(72) Inventors: Brendan N. Ryan, Limerick (IE); Rory Browne, Shannon (IE)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 14/870,568

(22) Filed: Sep. 30, 2015

(65) Prior Publication Data

US 2017/0093658 A1    Mar. 30, 2017

(51) Int. Cl.
| | |
|---|---|
| *G06F 15/173* | (2006.01) |
| *H04L 12/26* | (2006.01) |
| *H04L 29/08* | (2006.01) |
| *H04L 29/06* | (2006.01) |
| *H04L 12/24* | (2006.01) |

(52) U.S. Cl.
CPC ........ *H04L 43/067* (2013.01); *H04L 41/5009* (2013.01); *H04L 41/5041* (2013.01); *H04L 67/02* (2013.01); *H04L 69/22* (2013.01); *H04L 41/5025* (2013.01)

(58) Field of Classification Search
CPC .............. H04L 43/067; H04L 41/5009; H04L 41/5041; H04L 41/5025; H04L 67/02; H04L 69/22
See application file for complete search history.

(56) References Cited

U.S. PATENT DOCUMENTS

| | | | |
|---|---|---|---|
| 9,379,931 B2 * | 6/2016 | Bosch | ........... H04L 29/06 |
| 2004/0133678 A1 | 7/2004 | Tamura | |
| 2014/0362682 A1 | 12/2014 | Guichard et al. | |
| 2015/0089082 A1 | 3/2015 | Patwardhan et al. | |
| 2015/0092564 A1 * | 4/2015 | Aldrin | ........... H04L 41/5038 370/241.1 |
| 2015/0124815 A1 | 5/2015 | Beliveau et al. | |

(Continued)

OTHER PUBLICATIONS

International Search Report and Written Opinion dated Nov. 25, 2016 for International Application No. PCT/US2016/049477, 13 pages.

*Primary Examiner* — Moustafa M Meky
*Assistant Examiner* — Blake Rubin
(74) *Attorney, Agent, or Firm* — Schwabe, Williamson & Wyatt, P.C.

(57) ABSTRACT

Methods, systems, and storage media for monitoring service function path are disclosed herein. In an embodiment, a service function chain classifier module may receive a network data packet and applying to it a network packet service control that establishes an ordered chain of network service functions to apply to the network data packet as it traverses a service function path. The service function chain classifier module may incorporate into the network packet service control an indicator to obtain time information relating to application of one or more of the plural service functions to the network data packet. A network service performance module may receive the time information relating to the application of the one or more of the plural service functions to the network data packet and to monitor the time information. Other embodiments may be disclosed or claimed.

25 Claims, 7 Drawing Sheets

(56) References Cited

U.S. PATENT DOCUMENTS

| | | | |
|---|---|---|---|
| 2015/0195197 A1* | 7/2015 | Yong | H04L 45/74 370/392 |
| 2015/0334094 A1* | 11/2015 | Suresh | H04L 63/0471 713/153 |
| 2015/0341285 A1* | 11/2015 | Aysola | H04L 63/0428 370/392 |
| 2016/0099853 A1* | 4/2016 | Nedeltchev | H04L 43/0852 370/253 |
| 2016/0119226 A1* | 4/2016 | Guichard | H04L 29/0653 370/392 |
| 2016/0119253 A1* | 4/2016 | Kang | H04L 67/2814 370/228 |
| 2016/0226913 A1* | 8/2016 | Sood | H04L 63/20 |
| 2016/0248685 A1* | 8/2016 | Pignataro | H04L 47/2441 |
| 2016/0315921 A1* | 10/2016 | Dara | H04L 69/22 |
| 2017/0005920 A1* | 1/2017 | Previdi | H04L 45/306 |
| 2017/0078176 A1* | 3/2017 | Lakshmikantha | H04L 43/0852 |
| 2017/0093677 A1* | 3/2017 | Skerry | H04L 49/70 |

\* cited by examiner

SERVICE FUNCTION PATH PERFORMANCE MONITORING

FIELD

The present disclosure relates to the field of computer networking, and in particular, to apparatuses, methods and storage media associated with monitoring performance of service function chains, also known as ordered lists of network services.

BACKGROUND

Service function chaining provides the ability to define an ordered list of network services (e.g. firewall, NAT, video-optimizer, etc.) that are linked together in a network to create a service chain. Such service-chaining is advantageous to network service providers because they can direct selected network data packets, or traffic, to particular network service functions, rather than directing all traffic through all network service functions. Furthermore, service function chaining facilitates addition of new services or functions without affecting existing ones. Network Service Header (NSH) is a draft protocol before the Internet Engineering Task Force (IETF). NSH draft protocol specifies a header that may be inserted between the transport header and payload of a network data packet to enable it to traverse a service function chain or path. Currently, service function path performance monitoring uses hardware probes or vProbes to monitor network performance. These probes typically use standards, such as RFC2544, Y. 1731 and Y. 1564, that do not adequately test the performance of actual subscriber traffic in the user-plane because they utilize test traffic rather than real subscriber traffic flows.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
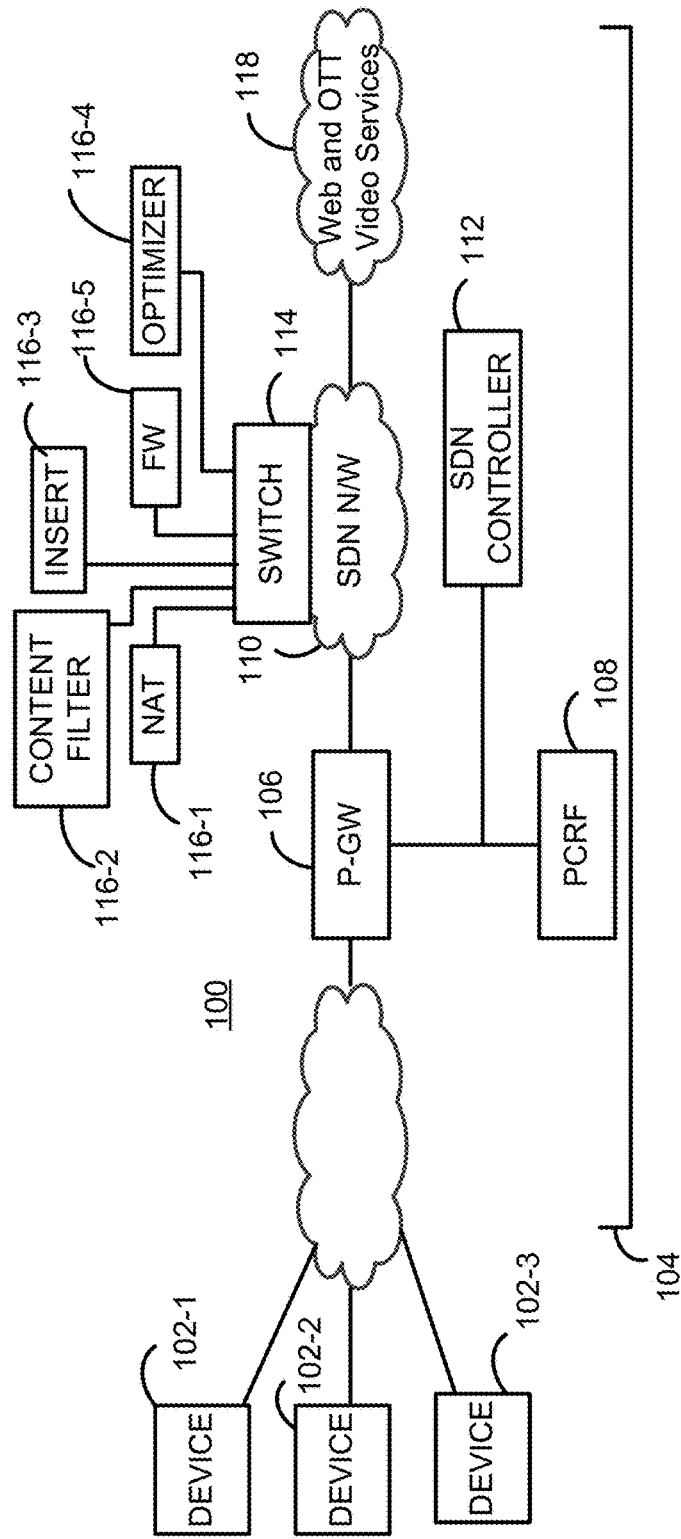
FIG. 1 illustrates a communication system in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed to imply that the various operations are necessarily order-dependent. In particular, these operations might not be performed in the order of presentation. Operations described may be performed in a different order than the described embodiments. Various additional operations might be performed, or described operations might be omitted in additional embodiments.

The description may use the phrases "in an embodiment", "in an implementation", or in "embodiments" or "implementations", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include any or any combination of an Application Specific Integrated Circuit (ASIC), an electronic circuit, a processor (shared, dedicated, or group) or memory (shared, dedicated, or group) that execute one or more software or firmware programs, a combinational logic circuit, or other suitable components that provide the described functionality.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "network element", may be considered synonymous to or referred to as a networked computer, networking hardware, network equipment, router, switch, hub, bridge, gateway, or other like device. The term "network element" may describe a physical computing device of a network with wired or wireless communication links. Furthermore, the term "network element" may describe equipment that provides radio baseband functions for data or voice connectivity between a network and one or more users.

As shown in FIG. 1, communication system 100 may include devices 102-1 to 102-3 (collectively referred to as "devices 102") in communication with a network 104, which may be a mobile network including a Gi-LAN network, for example, and may include a packet data network gateway (P-GW) 106, a policy control and rules function 108, a software-defined network (SDN) 110, a SDN controller 112, a switch 114 that switches between network service functions 116-1 to 116-5 (collectively referred to as "network service functions 116"), and access to one or more services 118 such as Web, over-the-top (OTT) video, or any other services, such as services included in a Web-access service chain. Network service functions 116 may include any or all of network address translation (NAT) 116-1, content filtering 116-2, content insertion 116-3, Web optimization 116-4, or firewall 116-5, or any of many other possible network service functions. A Web access service-chain is just one example of many applications or context in which service chains may be used. Another example in which a service chain may be used is voice over IP data flows.

Service function chaining may define from among any or all of the network service functions 116 an ordered list of service functions 116 that are linked together and performed successively as a service function chain. Such service function chaining may be advantageous to network service providers because it can allow selected traffic to bypass some service functions and it can facilitate adding new service functions without affecting others.

Figure 2:
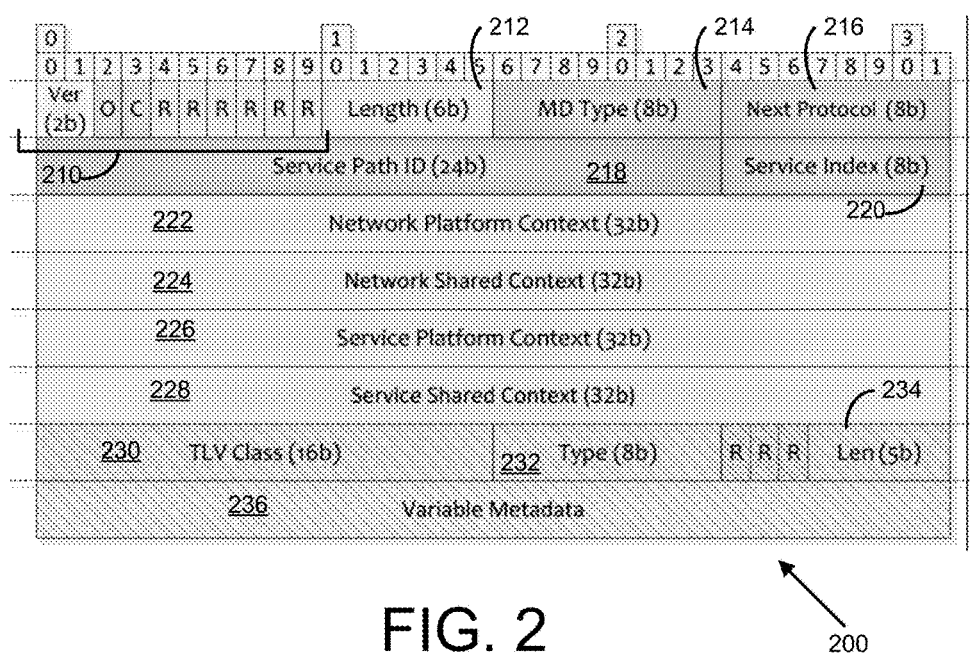
FIG. 2 is a diagram of a service function chaining (SFC) packet header.
Figure 3:
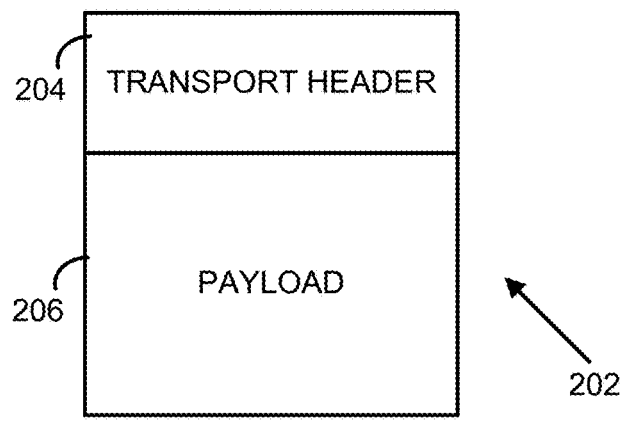
FIG. 3 is a diagram of a conventional network data packet.
Figure 4:
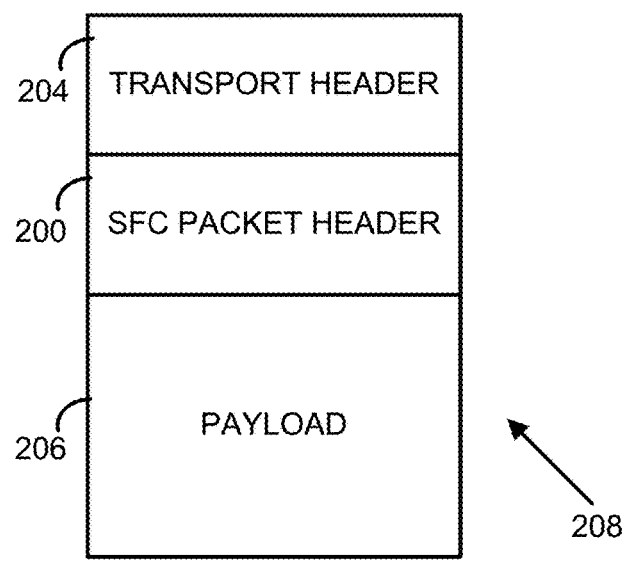
FIG. 4 is a diagram of a network data packet having incorporated in it a SFC packet header.

FIG. 2 is a diagram of a service function chaining (SFC) packet header 200 that may be used, among other things, to facilitate service function chaining. FIG. 3 is a diagram of a conventional network data packet 202, which may include a transport header 204 and a payload 206. FIG. 4 is a diagram of a network data packet 208 having incorporated in it an SFC packet header 200, which may be located between transport header 204 and payload 206. SFC packet header 200 is an example of a network packet service control that may be used to facilitate service function chaining by establishing an ordered chain of network service functions 116 to apply to the network data packet 208 as it traverses a service function chain or path of a network.

SFC packet header 200 may conform to a service function chaining protocol. For example, SFC packet header 200 may conform to a Network Service Header (NSH) protocol, which is a draft protocol before the Internet Engineering Task Force (IETF). In accordance with the draft NSH protocol, for example, SFC packet header 200 may include a multi-bit base header 210, a Length field 212, and MD Type field 214, a Next Protocol field 216, a Service Path ID field 218, a Service Index field 220, a Network Platform Context field 222, a Network Shared Context field 224, a Service Platform Context field 226, a Service Shared Context field 228, a TLV Class field 230, a Type field 232, a Len field 234, and a Variable Metadata field 236.

Figure 5:
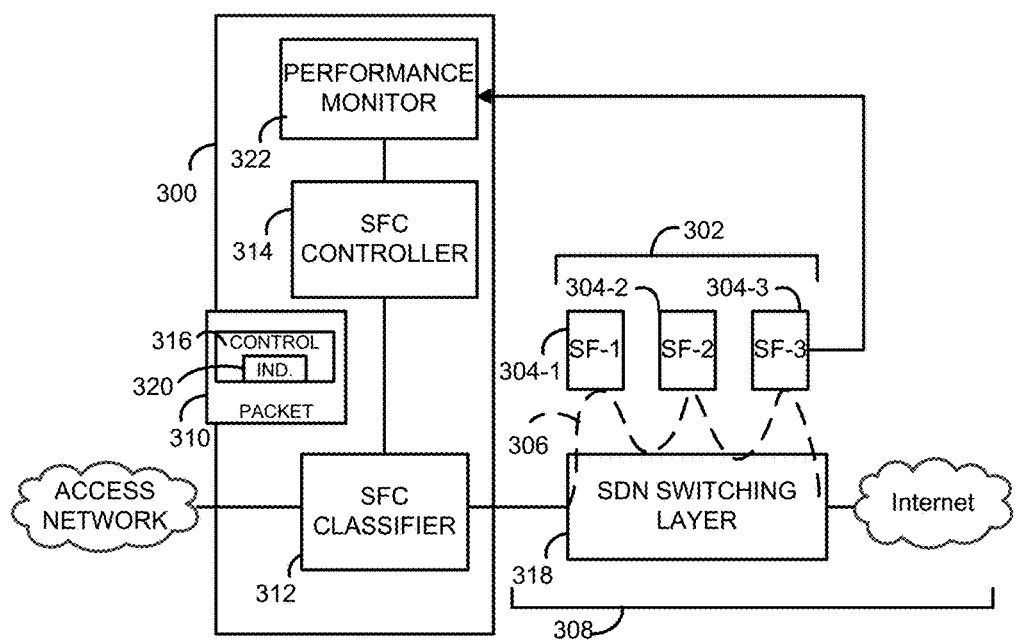
FIG. 5 is a diagram illustrating an apparatus for monitoring a service function chain.

FIG. 5 is a diagram illustrating an apparatus 300 for monitoring a service function chain 302 of multiple network service functions 304-1 to 304-3 (collectively referred to as "network service functions 304") traversed along a service function path 306 of a network 308 by a network data packet 310. Apparatus 300 may include a service function chain classifier module 312 and a service function chain controller module 314, each of which may be operated by at least one of one or more processors of one or more network elements. Network data packet 310 may include a network packet service control 316, which may be applied to network data packet 310 by service function chain classifier module 312 and may be analogous to network data packet 208 (FIG. 4). Network 308 may be analogous to network 104 (FIG. 1), but is represented in simplified form in FIG. 5 for purposes of illustration. Network 308 may include a SDN switching layer 318, and service function path 306 may pass between SDN switching layer 318 and successive network service functions 304.

Service function chain classifier module 312 may receive network data packet 310 and may incorporate in the network packet service control 316 of network data packet 310 an indicator, flag, or instruction 320 to obtain time information relating to application of one or more of service functions 304 to network data packet 310. For example, network packet service control 316 may include a metadata field (not shown) analogous to Variable Metadata field 236 (FIG. 2) of SFC packet header 200 (FIG. 2), as described below in greater detail.

According to indicator 320, one or more of network service functions 304 along service function path 306 may incorporate into network packet service control 316 time information regarding operation of the one or more network service functions 304 on network data packet 310. For example, the time information may include either or both of an ingress time that indicates a time when a network service function 304 receives the network data packet 310, and an egress time the indicates a time when the network data packet 310 passes from a network service function 304 after it operates on the network data packet 310. The time information may be referred to as one or more timestamps and may be in or utilize any suitable time format such as a 64-bit IEEE 1588 Precision Time Protocol (PTP) format or the ITU-T Synchronous Ethernet (SyncE) standard, and the timestamps may be started in reference to a Universal Time Coordinated (UTC) time, for example. Upon network data packet 310 passing from a last network service function 304 of service function path 306, the time information for all the network service functions 304 of service function path 306 may be provided to a network service performance monitor module 322, which may be operated by at least one of the one or more processors to monitor the time information.

As an example of one implementation in reference to packet header 200 (FIG. 2), classifier module 312 may incorporate an indicator to obtain time information in a manner that may include any or all of:

A. Setting C-bit in base header base header 210 to indicate that critical metadata TLV is present;
B. Setting MD type field 214 to a hex value 0x2 to indicate that optional variable length metadata is present;
C. Setting TLV Class field 230 to a hex value 0x10 to indicate key performance indicator (KPI) monitoring;
D. Setting Type field 232 to a hex value 0x01 to indicate time information key performance indicators (KPIs);
E. Setting in one or more variable metadata header fields 236 one or more options that may include whether ingress, egress, or both times are to be obtained for a service function, indication of service functions for which times are to be obtained, and how to handle service functions that may be unaware of the service function chaining protocol, such as the NSH protocol.

Figure 6:
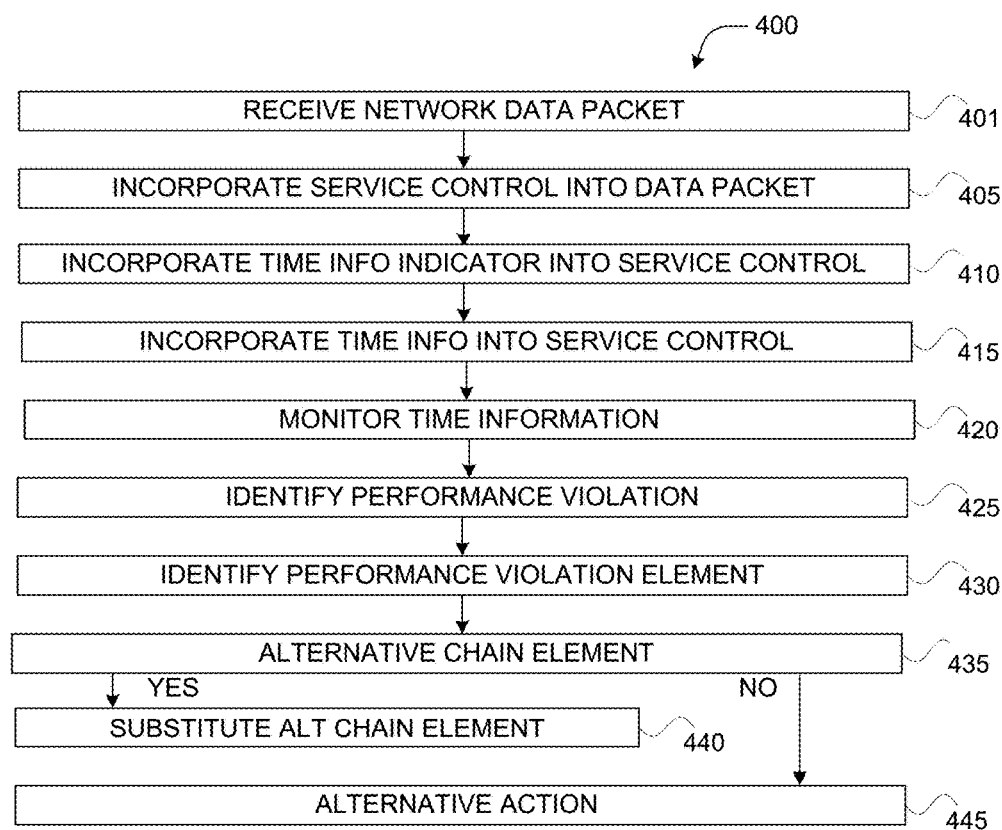
FIG. 6 is a flowchart illustrating an example process of monitoring a service function chain.

FIG. 6 is a flowchart illustrating an example process 400 of monitoring a service function chain. For illustrative purposes, the operations of process 400 may be performed by one or more network elements. However, it should be noted that other computing devices may operate the process 400. While particular examples and orders of operations are illustrated in FIG. 6, in various embodiments, these operations may be re-ordered, separated into additional operations, combined, or omitted altogether.

At operation 401, a network data packet may be received by a network element.

At operation 405, a network packet service control may be incorporated into the network data packet by the network element. The network packet service control may include multiple network service functions to be traversed by the network data packet along an ordered service function path or chain according to the network packet service control.

At operation 410, an indicator, flag, or instruction may be incorporated into the network packet service control, by the same or a subsequent downstream network element, to obtain time information relating to application of one or more of the network service functions to be traversed by the network data packet along the ordered service function path or chain. For example, the indicator, flag, or instruction may include an indication of the service function or functions for which times are to be obtained and whether the time information may include either or both of an ingress time that indicates a time when a network service function receives the network data packet, and an egress time that indicates a time when the network data packet passes from a network service function after it operates on the network data packet.

At operation 415, time information relating to application of the one or more of the network service functions may be incorporated into the network packet service control of the network data packet, by the preceding or subsequent downstream network elements.

At operation 420, time information relating to application of the one or more of the network service functions may be monitored for network service performance, by the preceding or subsequent downstream network elements. Monitoring of the time information for network service performance may include identification of one or more service function performance violations, which may include one or more time durations between any combination preselected combination of ingress and egress times exceeding one or more preselected time thresholds, for example. Such service function performance violations may indicate that time for performing a network service function or time between network service functions exceeds one or more preselected time thresholds. As examples, such service function performance violations may arise because a network service function, or an instance of a network service function, is malfunctioning or receiving excessive traffic, or a service function path or an instance of a service function path is malfunctioning or receiving excessive traffic, or one or more network elements operating a network service function or a service function path is malfunctioning or receiving excessive traffic, etc.

Process 400 of monitoring a service function chain may provide performance metrics or measurements of one or more instances of one or more service function chains relative to one or more performance thresholds. Also, or alternatively, process 400 may provide performance metrics or measurements of one or more network service functions in one or more in service function chains relative to performance thresholds. In one or more other implementations, may proceed with the following operations to modify network service functions to be traversed by subsequent network data packets according to identification of a service function performance violation in relation to one or more preceding network data packets.

At operation 425, one or more service function performance violations may be identified in connection with one or more network data packets, by the preceding or subsequent downstream network elements. The one or more service function performance violations may relate to operation of one or more instances of service function chains, one or instances of network service functions, transmission of one or more network data packets between network service functions, etc. Any service function chain or chains, network service function or functions, or instance or instances thereof associated with the one or more service function performance violations may be referred to as a performance violation service function chain element.

At operation 430, each performance violation chain element may be identified, by the preceding or subsequent downstream network elements.

At operation 435, a query may be made, by the preceding or subsequent downstream network elements, whether an alternative service function chain element is available for the sub-threshold service function chain element. If yes, operation 435 proceeds to operation 440. If no, operation 435 proceeds to operation 445.

At operation 440, an alternative service function chain element may be substituted, by the preceding or subsequent downstream network elements, for the performance violation service function chain element. The alternative service function chain element may include another instance of the performance violation chain element. Substitution of the alternative service function chain element for the performance violation chain element may be implemented, for example, by replacing the performance violation chain element referenced in the network packet service control of a network data packet with a reference to the alternative service function chain element. An implementation of such a replacement is described below in greater detail.

At operation 445, an alternative action may be performed if an alternative service function chain element is not available. The alternative action may include bypassing a performance violation service function chain element or activating an alarm or other notification to indicate that a service function is in performance violation (e.g., overloaded), which may result traffic being dropped or delayed excessively.

Figure 7:
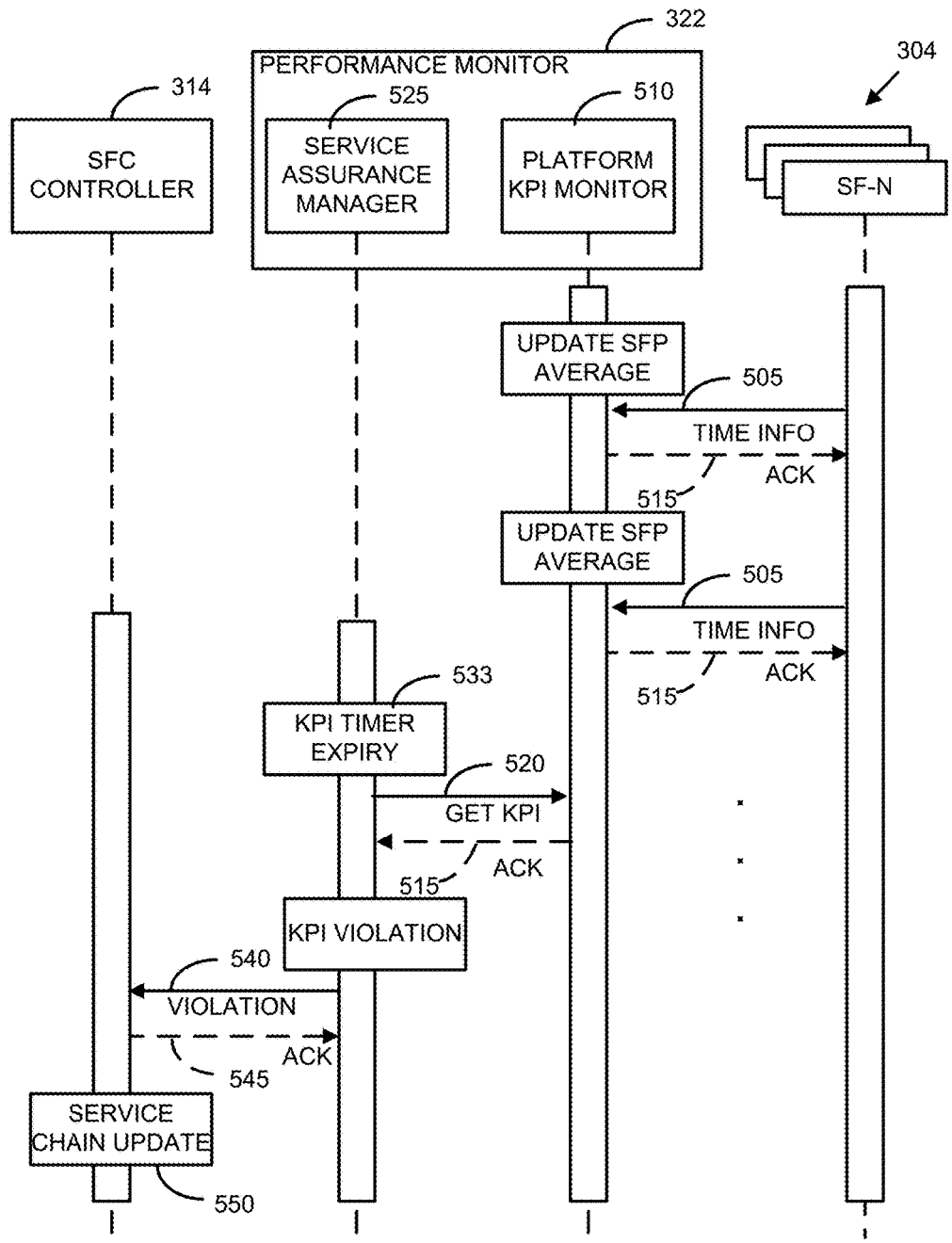
FIG. 7 is a combined block and flow diagram illustrating process operations between elements of an apparatus.

FIG. 7 is a combined block and flow diagram illustrating process operations between elements of apparatus 300 (FIG. 5).

At operation 505, time information from network service functions 304 may be provided to a platform key performance indicator monitor 510 of network service performance monitor module 322 for each of one or more network data packets 310 (FIG. 5). In one implementation, time information from all network service functions 304 of a service function path or chain may be provided to key performance indicator monitor 510 upon completion of the last of the network service functions 304 of the service function path or chain. Key performance indicator monitor 510 may update average network service function average performance metrics. At operation 515, an acknowledgement of the time information for a network data packet 310 is returned to the network packet service control 316 of network data packet 310.

At operation 520, a service assurance manager 525 of service performance monitor module 322 may request one or more key performance indicators from key performance indicator monitor 510. At operation 525, key performance indicator monitor 510 may provide the one or more key performance indicators to service assurance manager 525. At operation 530, a key performance indicator expiry 533 may indicate a time schedule for requesting the one or more key performance indicators from key performance indicator monitor 510. At operation 535, a key performance indicator violation may be identified with respect to the time information.

At operation 540, notification of a key performance indicator violation may be provided to service function chain controller module 314. At operation 545, an acknowledgement of the notification of a key performance indicator violation may be returned to service assurance manager 525.

At operation 550, service function chain controller module 314 may determine whether a service chain update or alternative is available and, if so, delivers the available service chain update or alternative to service function chain classifier module 312 for incorporation into the network packet service control 316 of subsequent network data packets 310.

Figure 8:
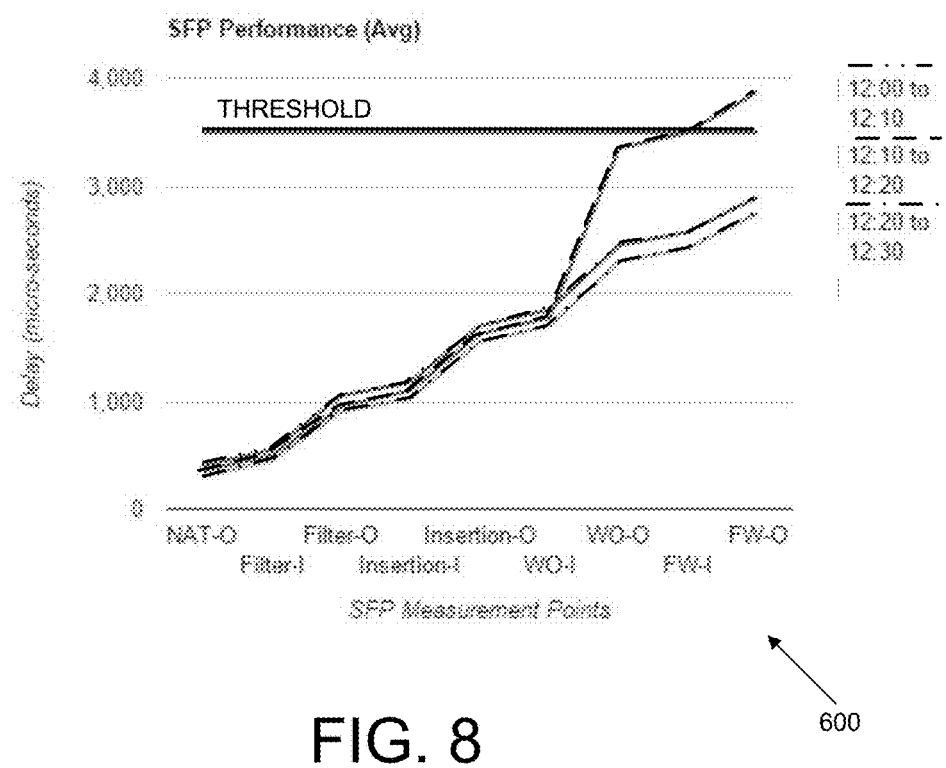
FIG. 8 is a graph illustrating monitoring a service function chain.

FIG. 8 is a graph of an example of SFP averages over three successive time periods 12:00-12:10, 12:10-12:20, 12:20-12:30, to illustrate time information from an illustrative service function chain. It will be appreciated that this example is merely illustrative. In this example, the time information includes, in sequence, egress or "out" time of a NAT (NAT-O), ingress and egress time of a filter (Filter-I and Filter-O), ingress and egress time of an insertion function (Insertion-I and Insertion-O), ingress and egress time of a Web optimizer function (WO-I and WO-O), and ingress and egress time of a firewall (FW-I and FW-O).

In this illustration, the average performance of the service function chain in the time period 12:00-12:10 is within the threshold performance, but from the time 12:10-12:20 the average performance of the service function chain exceeds the performance threshold time period and corresponds to a KPI violation in relation to the performance of the Web optimizer or packet transport from it. The average performance of the service function chain in the time period 12:20-12:30 illustrates correction of the KPI violation, such as by activation of an alternative instance of the Web optimizer.

With the methods, systems, and storage media for monitoring service function chains are disclosed herein, service providers can monitor the performance of their service chains (service functions and the virtual links that connect the functions) in real-time. With such monitoring, identification of a KPI violation may be used to modify a service chain or flow to correct the violation. For example, a service chain or flow may be diverted to an alternative service function instance, which may be in the same data center as the service function instance causing the KPI violation, or the alternative service function instance may be in a different data center. The methods, systems, and storage media for monitoring service function chains disclosed herein may be implemented with little performance overhead. For example, service functions currently nay update NSH fields as packets pass. Moreover, time information may be obtained for all or any portion of packets passing through a service chain, and may be obtained for a predetermined number of targeted packet types, which may be a percentage of the overall packet traffic Non-limiting Examples are provided below.

Example 1 may include a method for monitoring service function chain, comprising: receiving, by a network element, a network data packet; applying, by a network element, a network packet service control to the network data packet, the network packet service control establishing an ordered chain of plural network service functions to apply to the network data packet as it traverses a service function path of a network; incorporating, by a network element, into the network packet service control time information relating to application of one or more of the plural service functions to the network data packet; and providing, by a network element, to a network service performance monitor the time information relating to the application of the one or more of the plural service functions to the network data packet.

Example 2 may include the method of example 1 or of any other example or combination of examples disclosed herein, in which the network data packet includes a transport header and a payload and the network packet service control is incorporated in the network data packet between the transport header and the payload.

Example 3 may include the method of example 1 or of any other example or combination of examples disclosed herein, in which the time information includes an ingress time indicating a time when a network service function receives the network data packet.

Example 4 may include the method of example 1 or of any other example or combination of examples disclosed herein, in which the time information includes an egress time indicating a time when the network data packet passes from a network service function.

Example 5 may include the method of example 1 or of any other example or combination of examples disclosed herein, in which incorporating time information into the network packet service control comprises incorporating time information into a metadata portion of the network packet service control.

Example 6 may include the method of example 1 or of any other example or combination of examples disclosed herein, in which incorporating time information into the network packet service control comprises incorporating time information into the network packet service control in a Precision Time Protocol (PTP) format.

Example 7 may include the method of example 1 or of any other example or combination of examples disclosed herein, in which the service function path is included in a Web-access service chain.

Example 8 may include the method of example 1 or of any other example or combination of examples disclosed herein, in which the network packet service control includes a packet header of a Network Services Header protocol.

Example 9 may include the method of example 1 or of any other example or combination of examples disclosed herein, and may further include the network service performance monitor identifying and providing an indication of a service function performance violation.

Example 10 may include the method of example 9 or of any other example or combination of examples disclosed herein, and may further include modifying, in response to the service function performance violation, the service function path of a subsequent network data packet received by the network element.

Example 11 may include an apparatus for service function chain monitoring, comprising: one or more processors; a service function chain classifier module to be operated by at least one of the one or more processors to receive a network data packet and applying to it a network packet service control that establishes an ordered chain of plural network service functions to apply to the network data packet as it traverses a service function path of a network, and the service function chain classifier to be operated by at least one of the one or more processors to incorporate into the network packet service control an indicator to obtain time information relating to application of one or more of the plural service functions to the network data packet; and a network service performance module to be operated by at least one of the one or more processors to receive the time information relating to the application of the one or more of the plural service functions to the network data packet and to monitor the time information.

Example 12 may include the apparatus of example 11 or of any other example or combination of examples disclosed herein, and may further comprise a service function chain controller module to be operated by at least one of the one or more processors to store and provide to the service function chain classifier module a monitor policy specifying the time information to be incorporated into the network packet service control.

Example 13 may include the apparatus of example 12 or of any other example or combination of examples disclosed herein, in which the monitor policy may further specify the one or more network service functions for which time information is incorporated into the network packet service control.

Example 14 may include the apparatus of example 12 or of any other example or combination of examples disclosed herein, in which the network service performance module is further operated by the at least one of the one or more processors to provide to the service function chain controller module an indication of a service function performance violation.

Example 15 may include the apparatus of example 14 or of any other example or combination of examples disclosed herein, in which the service function chain controller module is further operated by the at least one of the one or more processors to provide to the service function classifier a service function path modification to modify, in response to the service function performance violation, the service function path of a subsequent network data packet received by the service function chain classifier module.

Example 16 may include the apparatus of example 11 or of any other example or combination of examples disclosed herein, in which the network data packet includes a transport header and a payload and the network packet service control is incorporated in the network data packet between the transport header and the payload.

Example 17 may include the apparatus of example 11 or of any other example or combination of examples disclosed herein, in which the time information includes an ingress time indicating a time when a network service function receives the network data packet.

Example 18 may include the apparatus of examples 11 or of any other example or combination of examples disclosed herein, in which the time information includes an egress time indicating a time when the network data packet passes from a network service function.

Example 19 may include the apparatus of example 11 or of any other example or combination of examples disclosed herein, in which the time information is incorporated into a metadata portion of the network packet service control.

Example 20 may include the apparatus of example 11 or of any other example or combination of examples disclosed herein, in which the time information is incorporated into the network packet service control in a Precision Time Protocol (PTP) format.

Example 21 may include the apparatus of example 11 or of any other example or combination of examples disclosed herein, in which the service function path is included in a Web-access service chain.

Example 22 may include the apparatus of example 11 or of any other example or combination of examples disclosed herein, in which the network packet service control includes a packet header of a Network Services Header protocol.

Example 23 may include at least one non-transitory computer-readable medium including instructions to cause a device, in response to execution of the instructions by the device, to: receive a network data packet; apply to the network data packet a network packet service control that establishes an ordered chain of plural network service functions to apply to the network data packet as it traverses a service function path of a network; incorporate into the network packet service control time information relating to application of one or more of the plural service functions to the network data packet; and provide to a network service performance monitor the time information relating to the application of the one or more of the plural service functions to the network data packet.

Example 24 may include the at least one non-transitory computer-readable medium of example 23 or of any other example or combination of examples disclosed herein, in which the network data packet includes a transport header and a payload and the network packet service control is incorporated in the network data packet between the transport header and the payload.

Example 25 may include the at least one non-transitory computer-readable medium of example 23 or of any other example or combination of examples disclosed herein, in which the time information includes an ingress time indicating a time when a network service function receives the network data packet.

Example 26 may include the at least one non-transitory computer-readable medium of example 23 or of any other example or combination of examples disclosed herein, in which the time information includes an egress time indicating a time when the network data packet passes from a network service function.

Example 27 may include the at least one non-transitory computer-readable medium of example 23 or of any other example or combination of examples disclosed herein, in which the time information is incorporated into a metadata portion of the network packet service control.

Example 28 may include the at least one non-transitory computer-readable medium of example 23 or of any other example or combination of examples disclosed herein, in which the time information is incorporated into the network packet service control in a Precision Time Protocol (PTP) format.

Example 29 may include the at least one non-transitory computer-readable medium of example 23 or of any other example or combination of examples disclosed herein, in which the service function path is included in a Web-access service chain.

Example 30 may include the at least one non-transitory computer-readable medium of example 23 or of any other example or combination of examples disclosed herein, in which the network packet service control includes a packet header of a Network Services Header protocol.

Example 31 may include the at least one non-transitory computer-readable medium of example 23 or of any other example or combination of examples disclosed herein, and may further include instructions to cause the network service performance monitor to identify and provide an indication of a service function performance violation.

Example 32 may include the at least one non-transitory computer-readable medium of example 31 or of any other example or combination of examples disclosed herein, and may further include instructions to modify, in response to the service function performance violation, the service function path of a subsequent network data packet.

Example 33 may include an apparatus for monitoring service function chain, comprising: means for receiving a network data packet; means for applying a network packet service control to the network data packet, the network packet service control establishing an ordered chain of plural network service functions to apply to the network data packet as it traverses a service function path of a network; means for incorporating into the network packet service control time information relating to application of one or more of the plural service functions to the network data packet; and means for monitoring the time information relating to the application of the one or more of the plural service functions to the network data packet.

Example 34 may include the apparatus of example 33 or of any other example or combination of examples disclosed herein, in which the network data packet includes a transport header and a payload and the network packet service control is incorporated in the network data packet between the transport header and the payload.

Example 35 may include the apparatus of example 33 or of any other example or combination of examples disclosed herein, in which the time information includes an ingress time indicating a time when a network service function receives the network data packet.

Example 36 may include the apparatus of example 33 or of any other example or combination of examples disclosed herein, in which the time information includes an egress time indicating a time when the network data packet passes from a network service function.

Example 37 may include the apparatus of example 33 or of any other example or combination of examples disclosed herein, in which the means for incorporating time information into the network packet service control incorporates time information into a metadata portion of the network packet service control.

Example 38 may include the apparatus of example 33 or of any other example or combination of examples disclosed herein, in which the means for incorporating time information into the network packet service control incorporates time information into the network packet service control in a Precision Time Protocol (PTP) format.

Example 39 may include the apparatus of example 33 or of any other example or combination of examples disclosed herein, in which the service function path is included in a Web-access service chain.

Example 40 may include the apparatus of example 33 or of any other example or combination of examples disclosed herein, in which the network packet service control includes a packet header of a Network Services Header protocol.

Example 41 may include the apparatus of example 33 or of any other example or combination of examples disclosed herein, in which the means for performance monitoring further identifies and provides an indication of a service function performance violation.

Example 42 may include the apparatus of example 41 or of any other example or combination of examples disclosed herein, which may further include means for modifying, in response to the service function performance violation, the service function path of a subsequent network data packet.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed:

1. A method, performed by an apparatus for monitoring a service function path, comprising:
   receiving a network data packet;
   applying a network packet service control to the network data packet, the network packet service control establishing an ordered succession of plural network service functions to apply to the network data packet as the network data packet traverses a service function path of a network, wherein the network packet service control includes an indication of whether time information relating to application of one or more of the plural network service functions is to include ingress time information, egress time information, or both;
   extracting the time information from the network packet service control, wherein the time information is incorporated into the network packet service control via the one or more of the plural network service functions in accordance with the indication; and
   monitoring the time information relating to the application of the one or more of the plural network service functions to the network data packet.

2. The method of claim 1 in which the network data packet includes a transport header and a payload and the network packet service control is incorporated in the network data packet between the transport header and the payload.

3. The method of claim 1 in which the time information includes an ingress time indicating a time when one of the plural network service functions receives the network data packet.

4. The method of claim 1 in which the time information includes an egress time indicating a time when the network data packet passes from one of the plural network service functions.

5. The method of claim 1 in which the time information is incorporated into a metadata portion of the network packet service control.

6. The method of claim 1 in which the time information is incorporated into the network packet service control in a Precision Time Protocol (PTP) format.

7. The method of claim 1 in which the service function path is included in a Web-access service path.

8. The method of claim 1 in which the network packet service control includes a packet header of a Network Services Header protocol.

9. The method of claim 1 further including identifying and providing an indication of a service function performance violation.

10. The method of claim 9 further including modifying, in response to identifying the service function performance violation, the service function path of a subsequent network data packet received by a network element.

11. An apparatus for service function path monitoring, comprising:
   one or more processors;
   a service function chain classifier module, to be operated by at least one of the one or more processors, to:
      receive a network data packet;
      apply a network packet service control to the network data packet, wherein the network packet service control is to establish an ordered succession of plural network service functions to apply to the network data packet as the network data packet traverses a service function path of a network; and
      incorporate into the network packet service control an indicator to obtain time information relating to application of one or more of the plural network service functions to the network data packet, wherein the indicator indicates whether the time information is to include ingress time information, egress time information, or both; and
   a network service performance module, to be operated by at least one of the one or more processors, to:
      receive the time information relating to the application of the one or more of the plural network service functions to the network data packet; and
      monitor the time information.

12. The apparatus of claim 11 further comprising a service function chain controller module to be operated by at least one of the one or more processors to store and provide to the service function chain classifier module a monitor policy specifying the time information to be incorporated into the network packet service control.

13. The apparatus of claim 12 in which the monitor policy further specifies the one or more network service functions for which time information is to be incorporated into the network packet service control.

14. The apparatus of claim 12 in which the network service performance module is further operated by the at least one of the one or more processors to provide to the service function chain controller module an indication of a service function performance violation.

15. The apparatus of claim 14 in which the service function chain controller module is further operated by the at least one of the one or more processors to provide to the service function chain classifier module a service function path modification to modify, in response to the service function performance violation, the service function path of a subsequent network data packet received by the service function chain classifier module.

16. The apparatus of claim 11 in which the network data packet includes a transport header and a payload and the network packet service control is to be incorporated in the network data packet between the transport header and the payload.

17. The apparatus of claim 11 in which the time information includes an ingress time indicating a time when a network service function receives the network data packet.

18. The apparatus of claim 11 in which the time information includes an egress time indicating a time when the network data packet passes from a network service function.

19. The apparatus of claim 11 in which the time information is incorporated into a metadata portion of the network packet service control.

20. At least one non-transitory computer-readable medium including instructions to cause a device, in response to execution of the instructions by the device, to:
   receive a network data packet;
   apply to the network data packet a network packet service control that establishes an ordered succession of plural network service functions to apply to the network data packet as the network data packet traverses a service function path of a network, wherein the network packet service control includes an indication of whether time information relating to application of one or more of the plural network service functions is to include ingress time information, egress time information, or both;
   extracting the time information from the network packet service control, wherein the time information is incorporated into the network packet service control via the one or more of the plural network service functions in accordance with the indication; and
   monitor the time information relating to the application of the one or more of the plural network service functions to the network data packet.

21. The at least one non-transitory computer-readable medium of claim 20 in which the network data packet includes a transport header and a payload and the network packet service control is to be incorporated in the network data packet between the transport header and the payload.

22. The at least one non-transitory computer-readable medium of claim 20 in which the time information includes an ingress time indicating a time when a network service function receives the network data packet.

23. The at least one non-transitory computer-readable medium of claim 20 in which the time information includes an egress time indicating a time when the network data packet passes from a network service function.

24. An apparatus for monitoring service function chain, comprising:
   means for receiving a network data packet;
   means for applying a network packet service control to the network data packet, the network packet service control establishing an ordered succession of plural network service functions to apply to the network data packet as the network data packet traverses a service function path of a network, wherein the network packet service control includes an indication of whether time information relating to application of one or more of the plural network service functions is to include ingress time information, egress time information, or both;
   means for extracting the time information from the network packet service control, wherein the time information is incorporated into the network packet service control via the one or more of the plural network service functions in accordance with the indication; and
   means for monitoring the time information relating to the application of the one or more of the plural network service functions to the network data packet.

25. The apparatus of claim 24 in which the means for monitoring further identifies and provides an indication of a service function performance violation.

* * * * *